United States Patent [19]

Nomura et al.

[11] 4,136,068

[45] Jan. 23, 1979

[54] CELLULOSE ESTER GRAFT POLYMER/ACRYLIC CO-POLYMER/AMINO RESIN WATER DISPERSIBLE COATING COMPOSITION

[75] Inventors: Yukio Nomura; Osamu Nagura, both of Nishinomiya; Hiromasa Masuda, Toyonaka, all of Japan

[73] Assignee: Nippon Oil and Fats Company, Limited, Tokyo, Japan

[21] Appl. No.: 823,731

[22] Filed: Aug. 11, 1977

[30] Foreign Application Priority Data

Aug. 12, 1976 [JP] Japan ............................ 51-95345

[51] Int. Cl.$^2$ ........................... C08L 1/10; C08L 1/14
[52] U.S. Cl. .................................. 260/15; 260/17 R; 260/17 A
[58] Field of Search ................... 260/17 A, 17 R, 15

[56] References Cited

U.S. PATENT DOCUMENTS

| | | | |
|---|---|---|---|
| 3,485,777 | 12/1969 | Gaylord | 260/17.4 |
| 3,645,939 | 2/1972 | Gaylord | 260/17.4 |
| 3,883,453 | 5/1975 | Takahashi et al. | 260/17 |
| 3,950,284 | 4/1976 | Tadanori et al. | 260/17 |
| 4,061,610 | 12/1977 | Glowaky | 260/17.4 ST |

*Primary Examiner*—Edward M. Woodberry
*Attorney, Agent, or Firm*—Stevens, Davis, Miller & Mosher

[57] ABSTRACT

A water dispersable coating composition usable for metallic coat and consisting mainly of the following three components A. a water dispersable cellulose graft polymer obtained by graft polymerizing styrene, ethylenically unsaturated carboxylic acid and the other copolymerizable vinyl monomer to a reaction product of a cellulose ester derivative having 1–20% by weight of free hydroxyl group with maleic anhydride, B. a water dispersable acrylic copolymer consisting of ethylenically unsaturated monomer having hydroxyl group, ethylenically unsaturated carboxylic acid and the other copolymerizable vinyl monomer, and C. amino resin.

10 Claims, No Drawings

CELLULOSE ESTER GRAFT POLYMER/ACRYLIC CO-POLYMER/AMINO RESIN WATER DISPERSIBLE COATING COMPOSITION

The present invention relates to a water dispersable coating composition containing an acrylic graft polymer of a cellulose derivative.

At present, as the coating of motorcars, the metallic coat in which a metallic coat dispersing aluminum powders is applied as an under coat and a clear coat is applied as a top coat, has been broadly used. In order to simplify the step of the metallic coat, a wet-on-wet coating has been carried out. This is a process wherein a metallic coat is applied and then set at room temperature for a few minutes, after which a clear coat is applied thereon and then baking is effected. This process is referred to as "two-coat-one-baking" and in this process, the step is simplified and the time is shortened as compared with the general coating step.

This wet-on-wet process is carried out by using a solvent type coat and an organic solvent having different boiling points can be freely selected as the diluting solvent, so that the beautiful coating surface can be obtained. That is, after applying the metallic coat, the solvent volatilizes rapidly from the coating film during setting, so that even if a clear coat is applied thereon and then the baking is effected, sagging does not occur and aluminum powders do not disarrange and a uniform beautiful metallic coating film can be obtained.

However, when the metallic coat is applied by using an aqueous coat by the wet-on-wet process, aluminum powders move and it is impossible to obtain a beautiful coating film wherein aluminum powders are uniformly arranged.

Namely, an aqueous coat is larger in the surface tension then an organic solvent as the volatile component and uses a large amount of water having a high evaporation latent heat, so that an aqueous metallic coat is slow in the evaporation of water from the coating film after coating and the metallic coat swells by the top coat of an aqueous clear coat and aluminum powders arranged uniformly in the coating film move or flow and the color varies, (when aluminum powders move, the coating surface becomes black) stripes are formed after flowing and it is difficult to obtain the beautiful even coating film. These facts are causes that the brilliance, luster, thick appearance of the coating film of the conventional aqueous metallic coat are inferior to those of the solvent type coat.

The inventors have earnestly studied in order to solve these problems and the present invention has obviated the drawbacks of the conventional aqueous coats and can provide the coating film having excellent brilliance and luster in which aluminum powders stably stick upon coating in metallic coat.

Namely, the coat of the present invention is the water dispersable coating composition consisting of the three components A, B and C described hereinafter.

A. A water dispersible cellulose graft polymer obtained by graft polymerizing styrene, an ethylenically unsaturated carboxylic acid and the other copolymerizable vinyl monomers to a reaction product of a cellulose ester derivative having 1–20% by weight of free hydroxyl group with maleic anhydride.

B. A water dispersable acryl copolymer consisting of an ethylenically unsaturated monomer having hydroxyl group, an ethylenically unsaturated carboxylic acid and the other copolymerizable vinyl monomers.

C. Amino resin

The water dispersable coating composition according to the present invention is not only suitable for the wet-on-wet system of metallic coat, but also even in one step coating of metallic coat, the beautiful coating film wherein aluminum powders are arranged uniformly, is obtained and even in a coloring coat containing a pigment and a clear coat, the drying is more rapid than the conventional aqueous coat and therefore the coating film wherein the sagging is few, can be obtained. Furthermore, the coating composition has the thermal reflow which smoothens the coating surface upon baking, so that the smothness of the coating surface is excellent.

The water dispersible cellulose graft polymer according to the present invention can be obtained as follows. A cellulose ester derivative shown by the general formula

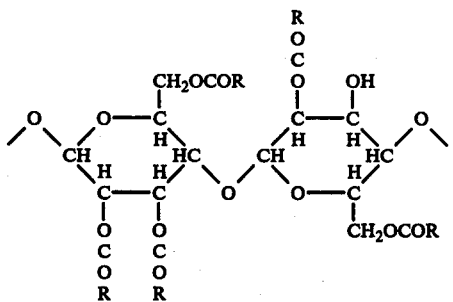

wherein R is $C_nH_{2n+1}$ group, n is 1–4, dissolved in an organic solvent, which has no hydroxyl group, has at least 5% by weight by water solubility and can dissolve the cellulose ester derivative and then the solution is reacted with maleic anhydride to form a half ester with hydroxyl group of the cellulose ester derivative, after which styrene, an ethylenically unsaturated carboxylic acid and the other copolymerizable vinyl monomers are copolymerized therewith in this solution.

The cellulose ester derivatives may be suitably half second butyrate, ten second butyrate, half second propionate, alcohol soluble butyrate, and alcohol soluble propionate made by Eastman Chemical Co. and particularly, CAB 551–0.2, CAB 553–0.4 and CAP 504–0.2 are preferable in view of easy graft copolymerization and solubility. In addition, nitrocellulose and acetylcellulose may be used. These compounds contain at least 1–20% by weight of free hydroxyl group in the molecule. The graft polymer can be directly obtained from cellulose acetate phthalate.

The organic solvents, which can dissolve the cellulose ester derivatives may be suitably acetone, methyl ethyl ketone, dioxane, ethylene glycol monomethylether acetate, diethylene glycol monomethylether acetate, diethylene glycol monomethylether acetate but the solvents having a temperature range from the reaction temperature to a boiling point of 80°–180° C. are preferable in view of the reaction temperature. The concentration of the cellulose ester derivatives dissolved in these solvents is 5–60% by weight.

An amount of maleic anhydride which is reacted with the cellulose ester derivatives depends upon an amount of free hydroxyl group of the cellulose ester derivatives but is generally 5–50% by weight.

Styrene in the mixed monomers which forms the graft chain in the reaction product of the cellulose ester derivative with maleic anhydride, has a relation to the graft ratio together with maleic anhydride and it is preferred to use 5–100 parts by weight of styrene based on 10 parts by weight of maleic anhydride.

The ethylenically unsaturated carboxylic acid in the mixed monomers gives the water dispersability to the cellulose graft polymer and acrylic acid, methacrylic acid, crotonic acid and the like are used and it is desirable to make the acid value of the cellulose graft polymer to be 30–100.

The other copolymerizable vinyl monomers may be suitably methyl acrylate, ethyl acrylate, n-propyl acrylate, isopropyl acrylate, n-butyl acrylate, cyclohexyl acrylate, octyl acrylate, 2-ethylhexyl acrylate, methoxyethyl acrylate, ethoxyethyl acrylate, butoxyethyl acrylate, methyl methacrylate, ethyl methacrylate, n-propyl methacrylate, isopropyl methacrylate, n-butyl methacrylate, cyclohexyl methacrylate, octyl methacrylate, 2-ethylhexyl methacrylate and lauryl methacrylate, vinyl acetate and vinyl ether may be used. These vinyl monomers may be used alone or in a combination of two or more vinyl monomers. The copolymerizable vinyl monomers, such as acrylates and methacrylates are used in an amount of 95–20 parts by weight to 5–80 parts by weight of the cellulose ester derivative.

The water dispersable acrylic copolymers are compatible with the water dispersable cellulose graft polymer and have hydroxyl group or amidomethylol group in order to react and cross link with an amino resin.

The water dispersable acrylic copolymers are preferred to be 30–100 of acid value in order to make said copolymer water dispersable.

The ethylenically unsaturated carboxylic acids may be suitably acrylic acid, methacrylic acid, crotonic acid, fumalic acid, maleic acid and the like.

As the ethylenically unsaturated monomers having hydroxyl group or amidomethylol group, mention may be made of hydroxyethyl acrynate, hydroxylethyl methacrylate, hydroxypropyl acrylate, hydroxypropyl methacrylate, polyethylene glycol monomethacrylate, polyproylene glycol monomethacrylate, methylol methacrylamide and the like. A compound having glycidyl group can be reacted with carboxyl group to obtain hydroxyl group.

An equivalent ratio of hydroxyl group/carboxyl group in the water dispersable acrylic copolymer is preferred to be 0.2–1.5. The vinyl monomers which can copolymerize therewith, include various acrylates, methacrylates, styrene, vinyl toluene, vinyl acetate. For the production of the water dispersable acrylic copolymers, various processes are used but the solution polymerization is usually adopted. For the polymerization initiator, the same compound as used in the water dispersable cellulose graft polymer may be used.

The water dispersable acrylic copolymer and the water dispersable cellulose graft polymer may be mixed after they are separately produced but the water dispersable cellulose graft polymer is previously produced and the mixed monomers to be used for the water dispersable acrylic copolymer may be added thereto to effect the polymerization.

For giving the water dispersability, 0.3–1.2 equivalents of an organic amine or ammonia based on the carboxyl group in the polymer is added. As the organic amine, mention may be made of trimethylamine, triethylamine, tributylamine, triethanolamine, dimethylaminoethanol and the like.

The concentration of the resin when diluted with water depends upon the kind and amount of the organic solvent and the amount of amine used in the reaction but is generally 25–40% by weight as the nonvolatile matter.

The amino resin to be used as the cross-linking agent may be suitably hexamethoxymethylmelamine, methoxybutoxymethylmelamine, methoxymethylated or methoxybutoxymethylated urea, quanamine and the like.

The water dispersable coating composition according to the present invention contains 10–34 parts by weight of the water dispersable cellulose graft polymer as the nonvolatile matter, 33–80 parts by weight of the water dispersable acrylic copolymer as the nonvolatile matter and 10–33 parts by weight of the amino resin as the nonvolatile matter. If desired, a water soluble acrylic polymer may be mixed. A pigment may be dispersed in the water dispersable cellulose graft polymer but when the dispersability of the pigment for a long period is taken into consideration, a mill base in which the pigment is dispersed in the water soluble acrylic polymer, is previously prepared and is mixed in the water dispersable cellulose graft polymer, whereby a stable coat dispersing a pigment can be obtained.

As mentioned above, the water dispersable coating composition containing the acrylic graft polymer of cellulose derivative have solved the following problems which have never been solved by the conventional aqueous coat.

Namely, in the one step coating of the metallic coat of a motorcar, aluminum powders stably stick and even in the metallic coat of the wet-on-wet system wherein the setting is effected for a few minutes and then a clear coat is applied, a uniform beautiful coating film in which aluminum powders do not disarrange, can be obtained. The sagging in coating is few as compared with the conventional aqueous coat and the coating composition has the thermal flow, so that the coating film becomes smooth by baking. The coating composition is used for the motorcar coating and the other industrial coatings, that is coatings of domestic electric articles, business machines, aluminum sash.

The following examples are given for the purpose of illustration of this invention and are not intended as limitations thereof. The "part" and "%" used herein mean by weight.

EXAMPLE 1

In a reaction vessel equipped with a stirrer, a tank for dropping monomers, a reflux cooler, a temperature regulator and a thermometer, 100 parts of methyl ethyl ketone was kept at 60° C., and 15 parts of cellulose acetate butyrate (CAB 551-0.2, made by Eastman Chemical Co.) was dissolved in the ketone. The resulting solution was heated up to 80° C., added with 3 parts of maleic anhydride and 1 part of pyridine, and further kept at 80° C. for 3 hours under stirring to react the cellulose acetate butyrate with the maleic anhydride. To the reaction product was added dropwise in 1 hour a monomer mixture consisting of 24 parts of styrene, 50 parts of methyl methacrylate, 10 parts of acrylic acid and 7 parts of benzoyl peroxide. After the addition, the resulting mixture was further kept at 80° C. for 1 hour to obtain a water dispersable cellulose graft polymer.

To the resulting polymer was added dropwise at 80° C. in 2 hours a monomer mixture consisting of 57 parts of methyl methacrylate, 50 parts of ethyl acrylate, 45 parts of n-butyl acrylate, 15 parts of 2-hydroxyethyl methacrylate, 13 parts of acrylic acid and 10 parts of benzoyl peroxide, and the resulting mixture was further kept at 80° C. for 2 hours to obtain a mixture of the water dispersable cellulose graft polymer and a water dispersable acrylic copolymer (hereinafter, this mixture is merely referred to as polymer mixture).

The polymer mixture was added with 14 parts of triethylamine, and then diluted with 585 parts of deionized water to obtain a bluish white translucent solution containing 30% of a nonvolatile matter and having a viscosity of 25.5 centipoises and a pH of 7.5. Even when the solution was subjected to a centrifugal separation at 12,000 r.p.m., the solution did not separate resin particles and was stable. In 85 parts of the diluted solution of the polymer mixture were dissolved 10 parts of a water soluble melamine resin (Sumimal M40W, made by Sumitomo Chemical C0., nonvolatile matter: 80%) and 5 parts of butyl cellosolve to obtain a clear coat of the present invention. The resulting coat was diluted with deionized water to adjust the Ford Cup #4 flow out viscosity to 20 sec/20° C., and the diluted coat was spray coated on a tin plate at 20° C. under a humidity of 65%, and baked and dried at 150° C. for 20 minutes to obtain a smooth and glossy hard coating film.

EXAMPLE 2

In the same reaction vessel as described in Example 1, 100 parts of ethylene glycol monoethyl ether acetate was kept at 100° C., and 15 parts of alcohol soluble cellulose acetate butyrate (CAB 553–0.4, made by Eastman Chemical Co.) was dissolved in the acetate. The resulting solution was added with 3 parts of maleic anhydride, and kept at 150° C. for 1 hour to react the alcohol soluble cellulose acetate butyrate with the maleic anhydride. After the reaction, a monomer mixture consisting of 15 parts of styrene, 57 parts of methyl methacrylate, 7 parts of acrylic acid and 3 parts of tertiary butyl perbenzoate was added dropwise to the reaction product at 150° C. in 1 hour, and the resulting mixture was further kept at 150° C. for 1 hour to effect a polymerization reaction and to obtain a water dispersable cellulose graft polymer.

To the resulting polymer was added dropwise at 150° C. in 2 hours a monomer mixture consisting of 100 parts of n-butyl methacrylate, 60 parts of n-butyl acrylate, 17 parts of 2-hydroxyethyl acrylate, 18 parts of acrylic acid and 3 parts of tertiary butyl perbenzoate, and the resulting mixture was further kept at 150° C. for 2 hours to effect a polymerization reaction and to obtain a polymer mixture.

The polymer mixture was added with 19 parts of triethylamine, and then diluted with 581 parts of deionized water to obtain a translucent white solution containing 31% of a nonvolatile matter and having a viscosity of 28 centi- and a pH of 7.3. The solution did not separate resin particles even in the centrifugal separation at 12,000 r.p.m. for 10 minutes. To 70 parts of the diluted solution of the polymer mixture was added 5 parts of aluminum powder paste (Alumi Paste 5100W, made by Toyo Aluminum Co.) dispersed in a mixture of 5 parts of isopropyl alcohol and 5 parts of ethyl cellosolve, and further were added 9 parts of a water soluble melamine resin (Cymel 303, made by A.C.C. Co.), and 1 part of dimethylaminoethanol to obtain a metallic coat of the present invention. The coat was diluted with deionized water to adjust the Ford Cup #4 flow out viscosity to 25 sec/20° C., and the diluted coat was spray coated on a tin plate at 20° C. under a humidity of 75% so as to from a coating film having a thickness of 30 microns after dried, set for 10 minutes and baked at 150° C. for 20 minutes to obtain a smooth metallic coating film having a thick appearance, which was free from disarrangement of the aluminum powders.

EXAMPLE 3

The metallic coat obtained in Example 2 was diluted with deionized water to adjust the Ford Cup #4 flow out viscosity to 50 sec/20° C., spray coated on a steel sheet at 25° C. under a humidity of 80% so as to form a coating film having a thickness of 15–20 microns after dried, and set at room temperature for 5 minutes. Further, the clear coat obtained in Example 1 was diluted with deionized water to adjust the Ford Cup #4 flow out viscosity to 70 sec/20° C., wet-on-wet coated on the above formed metallic coating so as to form a clear coating film having a thickness of 30–35 microns after dried, set at room temperature for 10 minutes, and then baked at 150° C. for 20 minutes. The resulting hardened coating film was a smooth and glossy metallic coating film, which was free from disarrangement of the aluminum powders.

EXAMPLE 4

In the reaction vessel described in Example 1, 150 parts of ethylene glycol monoethyl ether was kept at 130°–135° C. under mild reflux. A monomer mixture consisting of 164 parts of styrene, 300 parts of n-butyl acrylate, 82 parts of 2-hydroxyethyl methacrylate, 44 parts of acrylic acid and 11 parts of benzoyl peroxide was added dropwise to the ether in 2 hours, and the resulting mixture was further kept at 130°–140° C. for 2 hours to effect a polymerization reaction. Then, the polymerization product was diluted with 212 parts of ethylene glycol monobutyl ether, and added with 37 parts of triethylamine to obtain a water dispersable acrylic copolymer, which was a yellowish brown viscous liquid containing 60% of a monovolatile matter. To 166 parts of the resulting water dispersable acrylic copolymer were added 80 parts of Phthalocyamine Blue PRX (made by Toyo Ink Co.), 50 parts of ethylene glycol monobutyl ether, 30 parts of diethylene glycol monobutyl ether and 75 parts of deionized water. The resulting mixture was passed through a sand grind mill to disperse the pigment in the mixture, and mixed with 30 parts of aluminum powder paste (Alumi Paste 5100W, made by Toyo Aluminum Co.) dispersed in 30 parts of isopropyl alcohol, and further with 1,000 parts of the diluted solution of the polymer mixture obtained in Example 2 and 126 parts of a water soluble melamine resin (Sumimal M50W, made by Sumitomo Chemical Co.) to obtain a blue metallic coat containing 38.5% of a nonvolatile matter. The metallic coat was diluted with deionized water to adjust the Ford Cup #4 flow out viscosity to 35 sec/20° C., and spray coated at 27° C. under a humidity of 65% on a zinc phosphate-treated steel sheet (Bonderite #144, made by Japan Parkerizing Co.) so as to form a coating film having a thickness of 30–35 microns after dried, set for 10 minutes and baked at 150° C. for 30 minutes to obtain a smooth and glossy blue metallic coating film having no pinhole.

EXAMPLE 5

A mixture of 94 parts of the water dispersable acrylic copolymer obtained in Example 4, 502 parts of rutile-type titanium dioxide (JR-800, made by Teikoku Kako Co.), 82 parts of ethylene glycol monobutyl ether and 72 parts of deionized water was passed through a sand grind mill to disperse the pigment in the mixture, and diluted with a mixture of 72 parts of the water dispersable acrylic copolymer obtained in Example 4, 126 parts of a water soluble melamine resin (Nikalack MW-30, made by Nippon Carbide Co.) and 72 parts of a high boiling point solvent (Texanol, made by Eastman Chemical Co.), and further mixed with 1,000 parts of the diluted solution of the polymer mixture obtained in Example 2 to prepare a white coat containing 50% of a nonvolatile matter. The resulting coat was diluted with deionized water to adjust the Ford Cup #4 flow out viscosity to 35 sec/20° C., spray coated on a zinc phosphate-treated steel sheet (Bonderite #144) at 15° C. under a humidity of 40% so as to form a coating film having a thickness of 30–35 microns after dried, set for 10 minutes and then baked at 150° C. for 30 minutes to obtain a highly adhesive hard and smooth coating film.

EXAMPLE 6

In the reaction vessel described in Example 1, 100 parts of ethylene glycol monoethyl ether acetate was kept at 100° C., and 30 parts of cellulose acetate butyrate (CAB 551-0.2) was dissolved in the acetate. The resulting solution was kept at 150° C. for 1 hour together with 4 parts of maleic anhydride to react the cellulose ester with the maleic anhydride. To the reaction product was added dropwise in 1 hour a monomer mixture consisting of 12 parts of styrene, 44 parts of methyl methacrylate, 7 parts of acrylic acid and 3 parts of tertiary butyl perbenzoate, and the resulting mixture was further kept at 150° C. for 1 hour to effect a polymerization reaction and to obtain a water dispersable cellulose graft polymer. To the polymer was added dropwise in 2 hours a monomer mixture consisting of 50 parts of styrene, 50 parts of n-butyl methacrylate, 25 parts of 2-ethylhexyl acrylate, 12 parts of 2-hydroxyethyl methacrylate, 18 parts of acrylic acid and 5 parts of tertiary butyl perbenzoate, and the resulting mixture was further kept at 150° C. for 1 hour to effect a polymerization reaction and to obtain a polymer mixture.

The polymer mixture was stirred together with 23 parts of dimethylaminoethanol and then diluted with 578 parts of deionized water to obtain a translucent white solution containing 29% of a nonvolatile matter and having a viscosity of 53 centipoises and a pH of 6.3. To 90 parts of the diluted solution of the polymer mixture were added 25 parts of ethylene glycol monobutyl ether, 15 parts of diethylene glycol monobutyl ether, 20 parts of dimethylaminoethanol and 250 parts of rutile-type titanium dioxide (JR 701, made by Teikoku Kako Co.), and the resulting mixture was passed through a sand grind mill to disperse the pigment in the mixture. To the mixture were further added 520 parts of the above obtained diluted solution of the polymer mixture, 30 parts of ethylene glycol monobutyl ether and 50 parts of a water soluble melamine resin (Sumimal M30W, made by Sumitomo Chemical Co.) to prepare a white coat. This white coat was diluted with deionized water to adjust the Ford Cup #4 flow out viscosity to 35 sec/20° C. The diluted white coat contained 41% of a nonvolatile matter. The diluted white coat was spray coated at 20° C. under a humidity of 65% on a zinc phosphate-treated steel sheet (Bondelite #144) so as to form a coating film having a thickness of 35 microns after dried, set for 10 minutes and then baked at 150° C. for 30 minutes. The resulting hardened coating film had no pinhole and was smooth, glossy, hard and tough.

EXAMPLE 7

To 75 parts of the diluted solution of the polymer mixture obtained in Example 6 were added 7 parts of water soluble melamine resin (Sumimal M50W), 5 parts of isopropyl alcohol, 2 parts of dimethylaminoethanol and 4 parts of aluminum powder paste (Alumi Paste 5100W) to prepare a metallic coat. The metallic coat was diluted with deionized water to adjust the Ford Cup #4 flow out viscosity to 70 sec/20° C., and spray coated on a zinc phosphate-treated steel sheet (Bonderite #144) at 25° C. under a humidity of 85% so as to form a coating film having a thickness of 15–20 microns after dried, and set for 5 minutes to form a metallic coating. Further, a clear coat having a Ford Cup #4 flow out viscosity of 100 sec/20° C., which had been prepared by adding 10 parts of a water soluble melamine resin (Sumimal M50W) and 5 parts of diethylene glycol monobutyl ether to 8 parts of the diluted solution of the polymer mixture obtained in Example 6, and diluting the mixture with deionized water, was coated on the above formed metallic coating so as to form a clear coating film having a thickness of 30–35 microns after dried, set for 5 minutes, and then baked at 150° C. for 30 minutes to obtain a glossy metallic coating film, which was free from disarrangement of the aluminum powders.

EXAMPLE 8

Production of a water dispersable cellulose graft polymer.

In the reaction vessel described in Example 1, 300 parts of ethylene glycol monoethyl ether acetate was kept at 80° C., and 120 parts of cellulose acetate butyrate (CAB 551-0.2) was dissolved in the ether acetate. Then, 24 parts of maleic anhydride was added to the solution, and the resulting mixture was kept at 150–160° C. for 1 hour to effect a half esterification reaction of the cellulose acetate butyrate, and further kept at this temperature for 1.5 hours. Then, a monomer mixture consisting of 72 parts of styrene, 114 parts of methyl methacrylate, 42 parts of acrylic acid and 18 parts of tertiary butyl peroxybenzoate was added dropwise in 1 hour to the above obtained half esterification product kept at 150°–160° C., and the resulting mixture was further kept at this temperature for 2 hours to effect a grafting reaction. After cooled to 80°–90° C., the reaction product was stirred for 30 minutes together with 50 parts of triethylamine, and diluted with 235 parts of isopropyl alcohol to obtain a water dispersable cellulose graft polymer containing 40% of a nonvolatile matter.

EXAMPLE 9

Production of a water dispersable acrylic copolymer.

In the reaction vessel described in Example 1, 120 parts of ethylene glycol monoethyl ether was kept at 130°–140° C. under reflux, and a monomer mixture consisting of 120 parts of styrene, 126 parts of methyl methacrylate, 174 parts of n-butyl acrylate, 76 parts of 2-ethylhexyl acrylate, 40 parts of 2-hydroxyethyl methacrylate, 54 parts of acrylic acid and 10 parts of tertiary butyl peroxybenzoate was added dropwise to the ether in 2 hours. The resulting mixture was further kept at 130°–140° C. for 2 hours under reflux to effect a copolymerization reaction. After cooled to 80° C., the reaction product was stirred for 30 minutes together with 38 parts of triethylamine, and then added with 1,242 parts of deionized water. The resulting mixture was stirred until whole of the mixture was homogeneously emulsified, to obtain a bluish white water dispersable acrylic copolymer.

EXAMPLE 10

A mixture consisting of 140 parts of the water dispersable cellulose graft polymer obtained in Example 8, 743 parts of the water dispersable acrylic copolymer obtained in Example 9, 87 parts of a water soluble melamine resin (Sumimal M30W) and 30 parts of diethylene glycol was diluted with deionized water to prepare a clear coat having a Ford Cup #4 flow out viscosity of 35-40 sec/20° C.

While, 50 parts of Alumi Paste 5100W was previously wet with 50 parts of isopropyl alcohol and mixed with 150 parts of the water dispersable cellulose graft polymer obtained in Example 8, 600 parts of the water dispersable acrylic copolymer obtained in Example 9 and 70 parts of a water soluble melamine resin (Sumimal M30W), and the resulting mixture was diluted with deionized water to prepare a metallic coat having a Ford Cup #4 flow out viscosity of 30-35 sec/20° C.

The metallic coat was spray coated on a zinc phosphate-treated steel sheet (Bonderite #144) at 25° C. under a humidity of 60% so as to form a metallic coating film having a thickness of 10-15 microns after dried, and set for 5 minutes to form a metallic coating. Then, the above prepared clear coat was spray coated on the metallic coating so as to form a clear coating film having a thickness of 25-35 microns after dried, and set for 5 minutes, and further baked at 130° C. for 30 minutes to obtain a smooth and glossy metallic coating film, which was free from popping and disarrangement of the aluminum powders.

COMPARATIVE EXAMPLE 1

In the reaction vessel described in Example 1, 99 parts of propylene glycol monomethyl ether was kept at 80° C., and 30 parts of alcohol soluble cellulose acetate butyrate (CAB 553-0.4) was dissolved in the ether. The resulting solution was heated up to 120° C., and then added dropwise in 2 hours with a monomer mixture consisting of 50 parts of styrene, 75 parts of n-butyl acrylate, 55 parts of methyl methacrylate, 35 parts of 2-ethylhexyl acrylate, 15 parts of 2-hydroxyethyl methacrylate, 25 parts of acrylic acid, 4.5 parts of tertiary butyl perbenzoate and 2.5 parts of a nonionic surfactant (Nonion NS210, made by Nippon Oils And Fats Company Limited), and the resulting mixture was further kept at this temperature for 2 hours to effect a polymerization reaction. To the polymerization product was added 16 parts of triethylamine, and the resulting mixture was diluted with 594 parts of deionized water to obtain a translucent white liquid product containing 29% of a nonvolatile matter and having a viscosity of 18.5 centipoises and a pH of 7.7. When the resulting liquid product was subjected to a centrifugal separation at 12,000 r.p.m., 6.5% in the charged amount of the liquid product was precipitated. When 88 parts of the liquid product was mixed with 10 parts of the water soluble melamine resin (Sumimal M40W) and 5 parts of butyl cellosolve to prepare a clear coat in the same manner as described in Example 1 and the clear coat, after diluted with deconized water, was coated and baked on a tin plate in the same manner as described in Example 1, an opaque coating film having no gloss was obtained. Further, when a metallic coat was produced from the above obtained liquid product in the same manner as described in Example 2, and the metallic coat was coated and baked on a tin plate in the same manner as described in Example 2, the resulting coating film had no gloss and was poor in the sticking of aluminum powders contained therein. Therefore, when vinyl monomer is not grafted to the reaction product of a cellulose ester derivative with maleic anhydride, the effect aimed in the present invention cannot be attained.

What is claimed is:

1. A water dispersable coating composition consisting of the following three components
    A. 10-34 parts by weight of a water dispersable cellulose graft polymer obtained by graft polymerizing styrene, ethylenically unsaturated carboxylic acid and a vinyl monomer selected from the group consisting of methyl acrylate, ethyl acrylate, n-propyl acrylate, isopropyl acrylate, n-butyl acrylate, cyclohexyl acrylate, octyl acrylate, 2-ethylhexyl acrylate, methoxyethyl acrylate, ethoxyethyl acrylate, butoxyethyl acrylate, methyl methacrylate, ethyl methacrylate, n-propyl methacrylate, isopropyl methacrylate, n-butyl methacrylate, cyclohexyl methacrylate, octyl methacrylate, 2-ethylhexyl methacrylate, lauryl methacrylate, vinyl acetate and vinyl ether to a reaction product of a cellulose ester derivative having 1-20% by weight of free hydroxyl group with maleic anhydride,
    B. 33-80 parts by weight of a water dispersable acrylic copolymer consisting of ethylenically unsaturated monomer having hydroxyl group, ethylenically unsaturated carboxylic acid and a vinyl monomer selected from the group consisting of acrylates, methacrylates, styrene, vinyl toluene and vinyl acetate, and
    C. 10-33 parts by weight of amino resin selected from the group consisting of hexamethoxymethylmelamine, methoxybutoxymethylmelamine, methoxymethylated urea, methoxybutoxymethylated urea and guanamine, said parts by weight being amounts of non-volatile matter.

2. A water dispersable coating composition as claimed in claim 1, wherein an amount of maleic anhydride to be reacted with the cellulose ester derivative is 5-60% by weight.

3. A water dispersable coating composition as claimed in claim 1, wherein styrene in the water dispersable cellulose graft polymer (A) is used in an amount of 5-100 parts by weight based on 10 parts by weight of meleic anhydride.

4. A water dispersable coating composition as claimed in claim 1, wherein the ethylenically unsaturated carboxylic acid in the cellulose graft polymer (A) is selected from the group consisting of acrylic acid, methacrylic acid and crotonic acid.

5. A water dispersable coating composition as claimed in claim 1, wherein an acid value of said cellulose graft polymer (A) is 30-100.

6. A water dispersable coating composition as claimed in claim 1, wherein said copolymerizable vinyl monomer is used in an amount of 95-20 parts by weight to 5-80 parts by weight of said cellulose ester derivative.

7. A water dispersable coating composition as claimed in claim 1, wherein said water dispersable acrylic copolymer (B) has an acid value of 30-100.

8. A water dispersable coating composition as claimed in claim 1, wherein the ethylenically unsaturated carboxylic acid in said acrylic copolymer (B) is selected from the group consisting of acrylic acid, methacrylic acid, crotonic acid, fumaric acid and maleic acid.

9. A water dispersable coating composition as claimed in claim 1, wherein the ethylenically unsaturated monomer in said acrylic copolymer (B) is selected from the group consisting of hydroxyethyl acrylate, hydroxyethyl methacrylate, hydroxypropyl acrylate, hydroxypropyl methacrylate, polyethylene glycol monomethacrylate, polypropylene glycol monomethacrylate and methylol methacrylamide.

10. A water dispersable coating composition as claimed in claim 1, wherein an equivalent ratio of hydroxyl group/carboxyl group in the acrylic copolymer (B) is 0.2–1.5.

* * * * *